United States Patent [19]

Steeves et al.

[11] Patent Number: 4,938,989

[45] Date of Patent: Jul. 3, 1990

[54] METHOD OF MAKING PURE MAPLE SYRUP SUBSTITUTE AND THE SYRUP PRODUCTED THEREFROM

[76] Inventors: Roger W. Steeves, P.O. Box 44, Elgin, New Brunswick, Canada, E0A 1P0; Peter F. McKelvey, 220 Woodbridge Street, Fredericton, New Brunswick, Canada, E3B 4R3

[21] Appl. No.: 294,402

[22] Filed: Jan. 9, 1989

[30] Foreign Application Priority Data

Jun. 10, 1988 [CA] Canada .................................. 569233

[51] Int. Cl.⁵ .............................................. A23L 1/09
[52] U.S. Cl. ..................................................... 426/658
[58] Field of Search ........................................ 426/658

[56] References Cited

U.S. PATENT DOCUMENTS

| | | | |
|---|---|---|---|
| 187,747 | 2/1877 | Blackwell | 426/658 |
| 1,037,766 | 9/1912 | Hogan | 426/658 |
| 2,693,420 | 11/1954 | Straub | 426/658 |
| 2,895,833 | 7/1959 | Willits | 426/658 |
| 3,294,552 | 12/1966 | Topalean | 426/658 |
| 3,615,701 | 10/1971 | Goss | 426/658 |
| 3,878,306 | 4/1975 | Garstick | 426/658 |
| 4,159,210 | 6/1979 | Chen | 426/658 |
| 4,528,205 | 7/1985 | Turrisi | 426/658 |

FOREIGN PATENT DOCUMENTS 23399  2/1886  Canada .
46925  8/1894  Canada .
501045  3/1954  Canada .

OTHER PUBLICATIONS

Kander 1954 The New Settlement Cookbook Simon and Schuster New York p. 106.

*Primary Examiner*—Carolyn Paden

[57] ABSTRACT

A pure maple syrup substitute. The syrup comprises white sugar (36.975–61.625% by weight and preferably 49.3% by weight); fructose and glucose (each in the range of 3.825–4.675% by weight, and preferably each 4.25% by weight); maple flavour (0.117–0.143% by weight, preferably 0.13% by weight); maple syrup (11.25–18.75% by weight and preferably 15.00% by weight); and water (balance). The syrup is prepared by heating the water and dissolving the white sugar. The temperature is then preferably lowered to about 75° C. and the other ingredients are added with stirring until an homogeneous syrup is obtained. The syrup is virtually indistinguishable from natural maple syrup but is significantly less expensive.

17 Claims, No Drawings

METHOD OF MAKING PURE MAPLE SYRUP SUBSTITUTE AND THE SYRUP PRODUCTED THEREFROM

BACKGROUND OF THE INVENTION

I. Field of the Invention

This invention relates to a pure maple syrup substitute and a method of preparing such a syrup.

II. Description of the Prior Art

Pure maple syrup is prepared from the sap of maple trees by boiling off most of the water content of the sap until a thick dark brown sweet aromatic syrup remains. The product has a high commercial value because it has a flavour which is considered to be much more enjoyable than other syrups and because the production of maple syrup is labor and energy intensive. Moreover, the sap can be collected only during the spring and the resulting syrup loses its flavour to some extent during storage. Consequently the syrup tends only to be available on a seasonal basis.

Many attempts have been made in the past to produce a substitute for pure maple syrup, but all such artificial syrups tend not to have the distinctive flavour, colour and/or consistency of the natural product and have become accepted only because of their cheaper price. For example, previous attempts at producing maple syrup substitutes are disclosed in Canadian Pat. Nos. 23,399, 46,925 and 501,045, issued, respectively, to Charles McLean, Ira Shanton and Joseph Levasseur.

Accordingly, there is a need for a syrup that is very similar, if not identical, to natural maple syrup in terms of flavour, aroma, appearance and consistency while desirably being cheaper in price. It is only such a syrup that can act as a substitute for pure maple syrup.

SUMMARY OF THE INVENTION

According to the invention, there is provided a syrup capable of acting as a maple syrup substitute, which comprises the following ingredients in the following proportions:

| Ingredient | Percent by Weight |
| --- | --- |
| White sugar | 36.975–61.625 |
| Fructose | 3.19–5.31 |
| Glucose | 3.19–5.31 |
| Maple flavour | 0.0975–0.1625 |
| Maple syrup | 11.25–18.75 |
| Water | Balance |

According to another aspect of the invention there is provided a process for preparing a syrup capable of acting as a maple syrup substitute, which comprises: heating water to a temperature in the range of 85° C. to the boiling point, adding white sugar, fructose and glucose with stirring, lowering the temperature, then adding maple flavour and maple syrup and continuing to stir until an homogenous syrup is produced, the quantities of the ingredients being chosen so that said syrup has the composition indicated above.

DETAILED DESCRIPTION OF THE PREFERRED EMBODIMENTS

A preferred artificial syrup according to the present invention has the following composition:

| Ingredient | Percent by Weight |
| --- | --- |
| White sugar | 44.37–54.23 |
| Fructose | 3.825–4.675 |
| Glucose | 3.825–4.675 |
| Maple flavour | 0.117–0.143 |
| Maple syrup | 13.5–16.5 |
| Water | Balance |

The most preferred artificial syrup according to the present invention has the following composition:

| Ingredient | Percent by Weight |
| --- | --- |
| White sugar | 49.30 |
| Fructose | 4.25 |
| Glucose | 4.25 |
| Maple flavour | 0.13 |
| Maple syrup | 15.00 |
| Water | 27.07 |

The fructose and glucose can be obtained and used in combined form as invert sugar which is commercially available from numerous producers, e.g. the products sold under the trade marks NULOMOLINE, CALOROSE, INVESOL, INVERTOGEN, INSUBETA, TRAVERT, etc. Invert sugars normally contain fructose and glucose in about 50:50 proportions.

The maple flavour is preferably a natural maple extract, e.g. the product sold by Givaudan Ltd. of Montreal, Canada under the trade mark SPL-4076. Alternatively, an artificial maple flavour could be used if it closely resembles natural maple flavour.

The maple syrup used in the above formulations is preferably No. 2 amber maple syrup. This is a relatively dark coloured and pungent natural maple syrup that provides good colour, taste and aroma to the artificial syrup product. When this grade of natural maple syrup is used, the final product closely resembles No. 1 medium natural maple syrup.

The stated ingredients cannot simply be mixed together at room temperature because the solids do not easily dissolve. Instead the heating and mixing procedure outlined above should be employed.

The white sugar is preferably first fully dissolved before the fructose and glucose is added.

After the addition of the sugar, glucose and fructose, the solution is preferably passed through a pressure filter to remove particles and then the temperature is lowered to about 75°–85° C. before the addition of the other ingredients. As a process control measure, the solution can be adjusted to the same brix figure (66 degrees) used as a controlling parameter for maple syrup.

After the heating and mixing steps, the final syrup product can be hot filled (75°–85° C.) into bottles, cans or other containers and allowed to cool naturally. Glass containers are preferred.

The syrup product of the invention has the advantage that it is virtually identical to natural maple syrup in terms of taste, aroma, appearance, consistency, etc. while being substantially cheaper (at least 50% cheaper at present) and available at all times of the year (since the maple syrup used in the formulation does not have to be fresh). The product also has no artificial preservatives, colorants or flavours (if natural maple extract is employed) and will consequently appeal to health food enthusiasts.

The ingredients blend together in a way that makes the product a true pure maple syrup substitute unlike other syrups made from similar ingredients and/or proportions which differ in taste, consistency and/or odors. The syrup of the present invention also has the further advantage that it can be used to make maple butter, maple sugar and maple candy, just like natural maple syrup. Maple butter can be prepared from the syrup of the invention by heating the syrup to about 110° C. and then cooling it to about 38° C. with stirring. Maple sugar can be prepared by heating the syrup to about 115° C. and then cooling it to about 60° C. with stirring. Maple candy can be prepared by heating the syrup to about 127° C., pouring it into moulds, and then cooling it. The heating times should be adjusted in all cases to result in the formation of the desired product, as will be apparent to persons skilled in the art. These additional products appear to be indistinguishable in terms of taste, appearance and consistency from the same products made from pure natural maple syrup.

While preferred embodiments of the invention have been described in detail above, it will be apparent to persons skilled in the art that various modifications and alterations will be possible without departing from the scope of the invention as defined by the following claims.

What we claim is:

1. A syrup capable of acting as a pure maple syrup substitute, said syrup having the following composition:

| Ingredient | Percent by Weight |
| --- | --- |
| White sugar | 36.975–61.625 |
| Fructose | 3.19–5.31 |
| Glucose | 3.19–5.31 |
| Maple flavour | 0.0975–0.1625 |
| Maple syrup | 11.25–18.75 |
| Water | Balance | said maple flavour having been added to other ingredients at such a time and at such a temperature that said syrup has a similar flavour irrespective of the flavour of said maple syrup employed as an ingredient, and said syrup being capable of conversion to a product substantially identical to a natural product selected from the group consisting of maple butter, maple sugar and maple candy.

2. A syrup according to claim 1, having the following composition:

| Ingredient | Percent by Weight |
| --- | --- |
| White sugar | 44.37–54.23 |
| Fructose | 3.825–4.675 |
| Glucose | 3.825–4.675 |
| Maple flavour | 0.117–0.143 |
| Maple syrup | 13.5–16.5 |
| Water | Balance |

3. A syrup according to claim 1 having the following composition:

| Ingredient | Percent by Weight |
| --- | --- |
| White sugar | 49.30 |
| Fructose | 4.25 |
| Glucose | 4.25 |
| Maple flavour | 0.13 |
| Maple syrup | 15.00 |

-continued

| Ingredient | Percent by Weight |
| --- | --- |
| Water | 27.07 |

4. A syrup according to claim 1, wherein the fructose and glucose are obtained from invert sugar.

5. A syrup according to claim 1, wherein the maple flavour is a natural maple extract.

6. A syrup according to claim 1, wherein the maple syrup is No. 2 amber grade maple syrup.

7. A syrup according to claim 1, which has been produced by heating the water to a temperature in the range of 85° C. to the boiling point, adding white sugar, fructose and glucose with stirring, lowering the temperature, then adding the maple flavour and maple syrup and continuing to stir the mixture until an homogeneous product is produced.

8. A process for preparing a syrup capable of acting as a pure maple syrup substitute, said process comprising:
 heating water to a temperature in the range of 85° C. to the boiling point;
 adding white sugar, fructose and glucose, with stirring;
 lowering the temperature;
 adding maple flavour and maple syrup; and
 continuing to stir until an homogenous syrup is produced;
 the quantities of the above ingredients being chosen so that the homogeneous syrup has the composition indicated in claim 1.

9. A process according to claim 8, wherein said temperature is lowered to 75°–85° C. after adding said white sugar, fructose and glucose.

10. A syrup according to claim 7, wherein said temperature is lowered to 75°–85° C. after adding said white sugar, fructose and glucose.

11. A syrup capable of acting as a pure maple syrup substitute, said syrup having the following composition:

| Ingredients | Percent by Weight |
| --- | --- |
| White sugar | 36.975–61.625 |
| Fructose | 3.19–5.31 |
| Glucose | 3.19–5.31 |
| Maple Flavour | 0.0975–0.1625 |
| Maple syrup | 11.25–18.75 |
| Water | Balance | said maple flavour having been added to a mixture of other of said ingredients comprising at least said white sugar, fructose, glucose and water and the temperature of said mixture thereafter kept below about 85° C., and said syrup being capable of conversion to a product substantially identical to a natural product selected from the group consisting of maple butter, maple sugar and maple candy.

12. A syrup according to claim 11, having the following composition

| Ingredient | Percent by weight |
| --- | --- |
| White sugar | 44.37–54.23 |
| Fructose | 3.825–4.675 |
| Glucose | 3.825–4.675 |
| Maple flavour | 0.117–0.143 |
| Maple syrup | 13.5–16.5 |

| Ingredient | Percent by weight |
|---|---|
| Water | Balance. |

13. A syrup according to claim 11, having the following composition:

| Ingredient | Percent by weight |
|---|---|
| White sugar | 49.30 |
| Fructose | 4.25 |
| Glucose | 4.25 |
| Maple flavour | 0.13 |
| Maple syrup | 15.00 |

| Ingredient | Percent by weight |
|---|---|
| Water | 27.07. |

14. A syrup according to claim 11, wherein the fructose and glucose are obtained from invert sugar.

15. A syrup according to claim 11, wherein the maple syrup is No. 2 amber grade maple syrup.

16. A syrup according to claim 11, which has been produced by heating the water to a temperature in the range of 85° C. to the boiling point, adding white sugar, fructose and glucose with stirring, lowering the temperature, then adding the maple flavour and maple syrup and continuing to stir the mixture until an homogeneous product is produced.

17. A syrup according to claim 11, wherein said maple flavour is a natural maple extract.

* * * * *